United States Patent [19]

Irwin et al.

[11] Patent Number: 4,826,458
[45] Date of Patent: May 2, 1989

[54] GEAR BOX WITH RETAINED DRIVE MECHANISM

[76] Inventors: Charles H. Irwin, R.D. 1, Box 30; Arnold M. Lovine, R.D. 1, Box 29, both of Martville, N.Y. 13111

[21] Appl. No.: 154,967

[22] Filed: Feb. 10, 1988

[51] Int. Cl.⁴ .............................................. B60F 3/00
[52] U.S. Cl. .................................... 440/37; 440/75; 440/83; 74/413
[58] Field of Search ................. 440/37, 49, 53, 61, 440/75, 78, 83, 84, 111, 112; 74/413, 416, 417

[56] References Cited

U.S. PATENT DOCUMENTS

| | | | |
|---|---|---|---|
| 3,154,047 | 10/1964 | Casale | 440/75 |
| 4,015,555 | 4/1977 | Tinkham | 440/37 |
| 4,407,215 | 10/1983 | Cyr | 440/37 |
| 4,565,532 | 1/1986 | Conner | 440/61 |

FOREIGN PATENT DOCUMENTS 996477 6/1965 United Kingdom ............... 440/37

Primary Examiner—Sherman D. Basinger
Assistant Examiner—Stephen P. Avila
Attorney, Agent, or Firm—Wall and Roehrig

[57] ABSTRACT

A gear box for coupling the output from the crank shaft of an automotive engine to the hub of a pusher-type propeller for powering an air-boat. The gear box functions to eliminate any axial loading on the crank shaft of the automotive engine and provides a coupling of the output drive shaft to the pusher-type propeller such that in the event of the drive shaft failure, such as caused by the propeller striking a solid object, the propeller is retained in 15 its original position and prevented from flying off from the gear box in which it is mounted.

4 Claims, 2 Drawing Sheets

GEAR BOX WITH RETAINED DRIVE MECHANISM

BACKGROUND OF THE INVENTION

This invention relates in general to a gear box for transmitting power and, in particular, to a gear box for transmitting power wherein in the event the output drive shaft of the gear box is severed, the output drive mechanism will still be retained in the gear box to enhance safe operation.

More specifically, but without restriction to the particular embodiment and/or use which is shown and described for purposes of illustration, this invention relates to a gear box specially suited for adapting an automotive engine to a pusher-type propeller used for powering air-boats.

Air-boats are shallow draft water craft which are adapted for high speed movement over water which is too shallow for conventional boats. These air-boats are capable of movement over terrain such as ice and grasses, providing an extremely versatile vehicle capable of high speed movement over terrain which would be impassible to more conventional vehicles. Such air-boats are propelled by a motor-driven pusher propeller, which is positioned at the rear of the craft and above the boat hull to provide a pushing force for propelling the craft over water, ice, grasses etc. The hull of such water craft have a substantially flat or slightly curved bottom with a slightly raised bow, and generally draw very little water.

While air-boating began as a recreational sport, such vehicles are now found to have many applications including use as rescue vehicles and utility vehicles for conservation departments. Through their operational versatility air-boats provide access to many areas heretofore considered inaccessible. As air-boating has become ever increasingly popular, it has become necessary to provide a readily accessible source of engines for use in these vehicles, as well as a readily available source of parts for engine repair. Heretofore internal combustion aircraft engines have been used to power these vehicles, but the source of supply of piston-driven aircraft engines has diminished while the demand for air-boats has increased. Therefore, it has become necessary to consider the use of engines other than aircraft engines to power these air-boats.

Automotive engines and the repair parts therefore are generally and readily available as a potential source of power for air-boats. However, the output of an automobile engine, in terms of the designed revolutions per minute (rpm) of the crank shaft, is greater than the designed or manufacturer's recommended rotational speed of a pusher-type propeller used to power air-boats. These pusher-type propellers are frequently formed of a laminated wood, with a stainless steel tip which is not safe or efficient to run in excess of 3,000 rpm top speed. Therefore, in order to couple the output from an automotive engine to a pusher-type propeller, the output from the automotive engine must be coupled to the pusher-type propeller in a manner to meet both the automotive engine manufacturer's specification for safe and efficient operation, and the manufacturer's specifications for the operation of a pusher-type propeller to achieve the maximum push power at which the propeller is operated.

Automotive engines, also are designed for rotational movement of the crank shaft free from any axial loading. In the operation of any type of propeller, an axial load is applied to the engine when rotational movement is imparted whether the propeller is of a tractor or pusher type. Therefore, in order to utilize an automotive engine for an air-boat application, accommodation must be made for the axial loading which must be applied by the pusher-type propeller to the automotive engine.

Another consideration which must be accommodated is the safety of the air-boat operator, and those persons in the areas wherein such air-boats are operated. When a propeller is being driven by an aircraft engine for flight, the propeller is not generally operated in an environment wherein the propeller is exposed for contacting any solid objects. Therefore, such aircraft propellers are secured to an output drive shaft of the engine for rotation therewith. In the event that the output drive shaft would fail, the axial force loading created by the rotational movement of the propeller would cause the propeller to separate from the engine, and go freewheeling through space until the propeller crashes to the ground. The frequency with which a propeller might strike a solid object creating such circumstances when in flight, is extremely rare. In the event that such an occasion would occur, creating a "fly-away" propeller, such an event would create a safety hazard. However, the frequency with which such occasions might occur is so low that propellers are fastened directly to the output drive shaft of aircraft engines without any provision to prevent such an occurrence.

In the operation of air-boats, however, such boats are frequently operated in swampy areas with overhanging tree limbs. While provisions are made to engage the rotating prop, these propellers can come into contact with solid objects such as tree limbs or overhanging branches. Therefore, the frequency with which the propeller on an air-boat can be broken and/or cause the output drive shaft to break is far greater than when a propeller is used to power an aircraft in flight. When such "fly-away" propellers occur, the propellers create an extremely dangerous situation to the air-boat operator and those persons in the area. If, however, the occurrence of fly-away propellers is prevented, such a failure would at most be an inconvenience, since the air-boat would just remain afloat until such time as servicing or towing help arrived.

The present invention permits an automotive engine to be coupled to a pusher-type propeller for use in an air-boat. The pusher-type propeller is mounted to an output drive shaft of a gear box in a manner such that in the event the propeller strikes a solid object breaking the output drive shaft, the propeller will be retained in its original orientation and cannot become a "fly-away" creating a safety hazard.

SUMMARY OF THE INVENTION

It is, therefore, an object of this invention to couple an aircraft propeller to an automotive engine.

Another object of this invention is to secure an aircraft propeller onto an output drive shaft in a manner to prevent the propeller from becoming a "fly-away" from the engine through which the propeller is powered in the event of an output drive shaft failure.

A further object of this invention is to improve operational safety of air-boats.

Still another object of this invention is to provide a readily accessible source of engines, and repair parts therefore, to power air-boats.

These and other objects are attained in accordance with the present invention wherein there is provided a gear box for coupling the output from the crank shaft of an automotive engine to the hub of a pusher-type propeller for powering an air-boat. The gear box functions to eliminate any axial loading on the crank shaft of the automotive engine and provides a coupling of the output drive shaft to the pusher-type propeller such that in the event of the drive shaft failure, such as caused by the propeller striking a solid object, the propeller is retained in its original position and prevented from flying off from the gear box in which it is mounted.

DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein.

DESCRIPTION OF A PREFERRED EMBODIMENT

Figure 1:
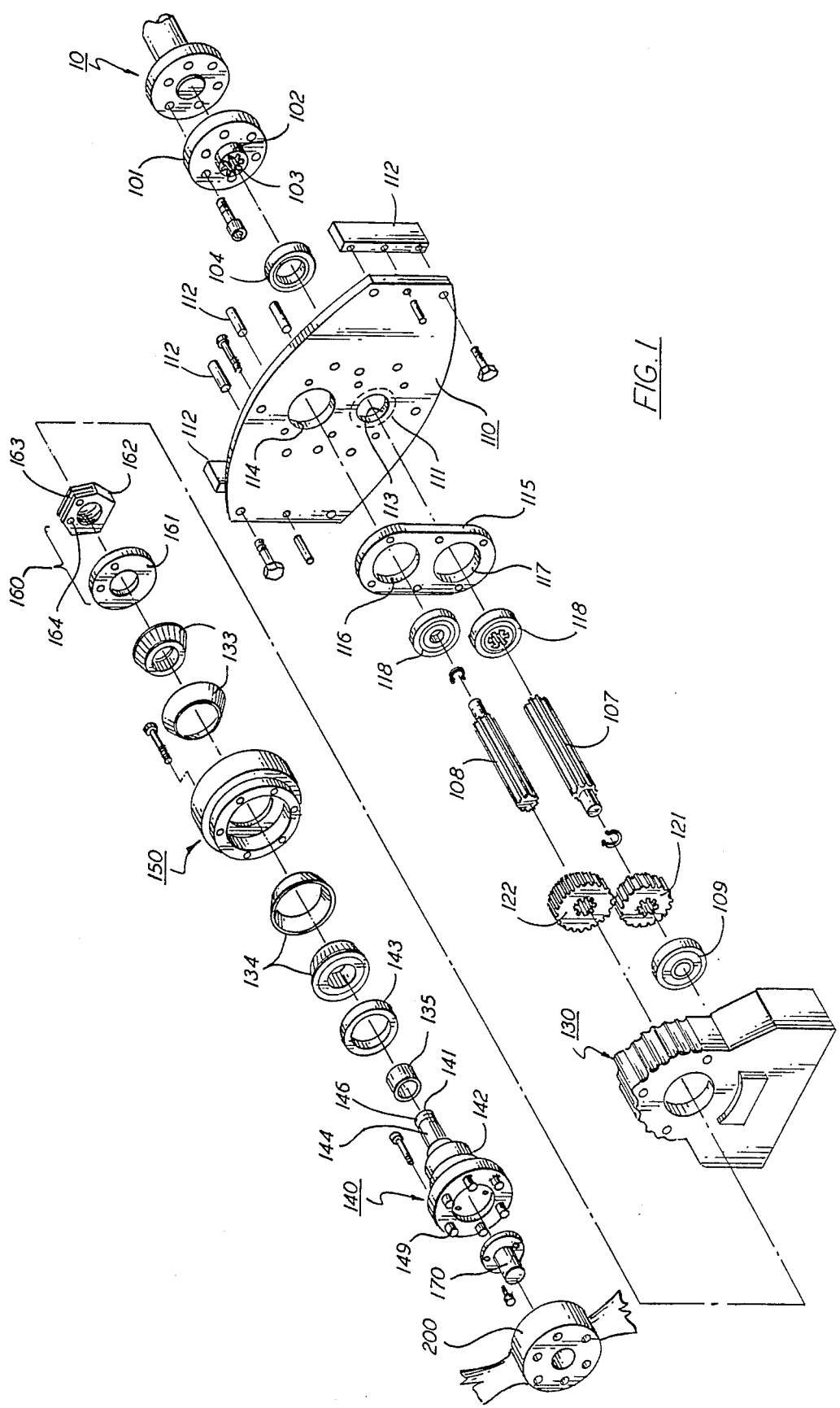
FIG. 1 is an exploded view of the invention to better illustrate the component parts and the manner in which they function.

Referring to the drawings, there is illustrated a portion of a drive shaft 10 of an automobile engine, which is not shown in its entirety. The portion of the drive shaft 10 is formed with a bolt pattern to which in normal operation the fly-wheel or the flex-plate are secured for connection to the transmission or clutch mechanism. In the present invention a drive shaft adaptor plate 101 having the same bolt pattern as this portion of the drive shaft 10 is secured for rotational movement to the drive shaft by appropriate fasteners.

Figure 2:
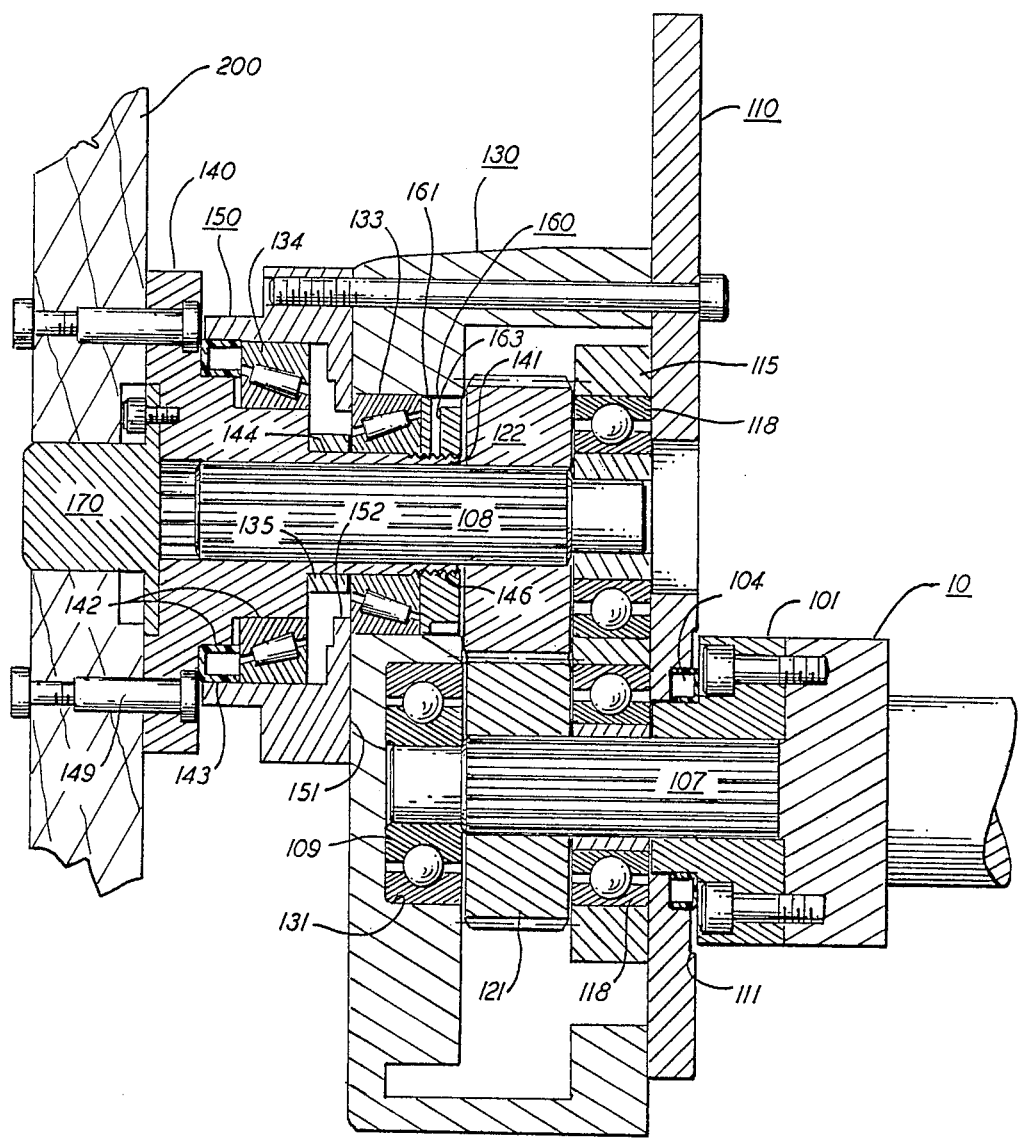
FIG. 2 is an enlarged cross-sectional view of the assembled invention.

The adaptor plate 101 has a stepped or shoulder portion 102 upon which is mounted an oil seal 104 which functions to prevent oil from leaking through a mounting plate 110 by which the gear box is secured to the automotive engine. The drive shaft adaptor plate 101 is provided with a splined internal opening 103 for receiving a splined input drive shaft 107 which is rotationally driven by the drive shaft 10 through the drive shaft adaptor plate 101. As best illustrated in FIG. 2, the face of the mounting plate 110 positioned adjacent to the drive shaft adaptor plate 101 is formed with an undercut portion 111 into which a portion of the drive shaft adaptor plate 101 is received to facilitate the sealing function of the oil seal 104.

The mounting plate 110 may be formed in different configurations, and will utilize spacers 112 of varying sizes and configurations depending upon the particular automotive engine to which the gear box is to be adapted. These spacers 112 are appropriately secured to the mounting plate 110 and function to position the gear box normal to the rotational axis of the vehicle engine drive shaft 10. Therefore, the particular geometry necessary for this positioning will depend upon the configuration of the automotive engine to which the gear box is being adapted. A bearing mounting plate 115 having a pair of apertures 116 and 117 machined therein is secured to the mounting plate 110 in a position wherein the apertures 116 and 117 formed in the bearing mounting plate 115 are coaxial with a pair of openings 113 and 114 formed in the mounting plate.

The bearing mounting plate 115 has positioned in the apertures 116 and 117 a ball-bearing 118 which functions to support the middle of the input drive shaft 107 and one end of an output drive shaft 108, respectively. The bearings 118 function to support the input and output drive shafts 107 and 108, respectively, for rotational movement. As previously discussed, the output from the drive shaft 10 of the automotive engine, when operated in the manner intended by the engine manufacturer for economical and efficient operation, exceeds the limits of the rotational speed of a pusher-type propeller 200. Therefore a drive gear 121 secured onto the splined input drive shaft 107 is of a smaller size than a driven gear 122 which is secured on the splined output drive shaft 108 so that the rotational speed of the output drive shaft 108 will be less than the rotational speed of the input drive shaft 107 to accommodate the rotational speed limit of the pusher-type propeller 200 to which the output drive shaft is coupled. A ball bearing 109 is positioned within a recessed 131 formed in a gear case 130 to rotationally support the other or outboard end of the input drive shaft 107.

In order to prevent the axial forces created by the rotational movement of the pusher-type propeller 200 from being imposed on the drive shaft 10 of the vehicle engine, a pair of thrust bearings 133 and 134 are provided to accommodate such loading forces. The inboard end of the output drive shaft 108, as described above, is supported for rotational movement on the ball-bearing 118 positioned within the aperture 116 of bearing mounted plate 115. The larger drive gear 122 is mounted onto the splines of the output drive shaft 108 and the outboard end of the output drive shaft 108 is positioned within a splined opening 141 of a prop hub or a prop adaptor plate 140.

The prop hub or prop adaptor plate 140 is formed with a shoulder portion 142 best seen in FIG. 2, upon which is mounted an oil seal 143. The inner race of the thrust bearing 134 is press fit onto the shoulder portion 142 of the prop hub 140, and the outer race of the thrust bearing 134 is press fit into a cover 150 of the gear case 130.

A spindle portion 144 of the prop hub 140 has the inboard end threaded 146 t receive a lock nut 160 assembly which functions to retain the prop hub 140 attached to the cover 150 of the gear case, in the event that the propeller 200 might strike a solid object and shear the output drive shaft 108. In this manner, as described in more detail hereinafter, a "fly-away" or runaway propeller is prevented. To this end a spacer 135 is positioned about the spindle portion 144 of the prop hub 140 and the thrust bearing 134 is positioned about the spindle portion 144 abutting the spacer 135 and being positioned from contacting the other thrust bearing 133. Both of these thrust bearings are of the type commonly referred to as tapered roller bearings. The lock nut assembly 160 is adapted to be threaded onto the inboard end 146 of the prop hub 140, and in this manner may be tightened against the thrust bearing 133 to create a predetermined pre-load on the bearing against the spacer without binding the thrust bearings.

As best shown in FIG. 2, the inboard or rear face 151 of the cover 150 is closed except for an opening 152 formed therein which is of a size through which the spindle portion 144 of the prop hub 140 will pass, but which will prevent the passage of a securing plate 161 which forms a part of the lock nut assembly 160. In this manner, when the prop hub or prop adaptor 140 has been positioned into the cover 150, and the lock nut assembly 160 threaded onto the threaded inboard end 146 of the spindle portion 144, the securing plate 161 will be positioned in contact with the rear face 151 of the cover 150 in preloading the thrust bearings, but will not be able to pass through the opening 152 formed in the inboard side of the cover 150.

The pusher-type propeller 200 is secured to the prop hub or prop adaptor 140 by means of a hub end plate 170 bolted to the prop hub 140 and which functions as a centering device for receiving a central opening of the propeller 200. The propeller 200 is formed with a plurality of circumferentially spaced bolt holes, which correspond to the bolt pattern formed in the prop hub 140, and by which the propeller 200 is secured to the prop hub. To this end a plurality of prop bushings 149 are positioned extending outwardly through the outboard end of the prop hub 140 to be received within the propeller 200 such that the prop bushings 149 function to impose the rotational force onto the propeller 200 as well as to secure the propeller 200 to the prop hub 140.

In the event the prop 200 would strike a solid object, for example, shearing the output drive shaft 108, the propeller 200 could not pull away or out from the gear box. The connecting of the propeller 200 to the outboard end of the prop hub or prop adaptor 140, and the securing of the inboard threaded end 146 of the spindle portion 144 of the prop hub to the gear box cover 150 by the lock nut assembly 160 will permit the propeller 200 to turn freely in the event the output drive shaft 108 is sheared, but will not permit axial movement of the propeller 200 which will be retained in the gear box due to the interference relationship between the securing plate 161 of the lock nut mechanism 160 and the hole 152 formed in the inboard face 151 of the cover 150.

In order to prevent the lock nut mechanism 160 from becoming loosened during operation of the air-boat, the nut portion 162 is slotted 163 and a pair of bolts 164 are threaded into the slotted portion such that after the lock nut mechanism 160 has been tightened against the inboard face 151 of the cover 150, the bolts 164 are tightened to bind the threads of the lock nut 162 to prevent the rotation thereof. Preferably, the bolts 164 are threaded into the securing plate 161 secured to the lock nut 162 as additional assurance that the lock nut mechanism 160 provides the desired function.

While the invention has been described in the specification and illustrated in the drawings with reference to a preferred embodiment, it will be understood by those skilled in the art that various changes may be made and equivalents substituted for elements of the invention without departing from the scope of the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A gear box drive having an output drive shaft which is restrained to prevent axial movement outward from the gear box housing comprising:
   a gear box housing having an input drive shaft and an output drive shaft rotatably supported therein,
   a drive gear mounted on each of said input and output drive shafts such that rotation of said input drive shaft will effect rotation of said output drive shaft,
   means for coupling said input drive shaft to an engine for imparting a rotational movement thereto,
   coupling means operatively connected to said output drive shaft to be rotationally driven therewith,
   said coupling means adapted to have coupled thereto a propeller for imparting a rotational movement thereto in response to the rotational movement imparted to said input drive shaft.
   said coupling means including output drive shaft connecting means for engaging said output drive shaft to effect rotational movement of said coupling means with said output drive shaft,
   said output drive shaft connecting means including thrust-bearing means to receive an axially directed force applied to said coupling means by a propeller when coupled thereto for rotational movement,
   cover means having an aperture formed therein for receiving said output drive shaft connecting means therethrough,
   said thrust-bearing means including a first and a second thrust bearing within which said coupling means is rotatable wherein said first and second thrust bearings are positioned on opposite sides of the aperture formed in said cover means with an end portion of said output drive shaft connecting means extending through said cover means to a side opposite to the side of said cover at which said thrust-bearing means are positioned,
   said aperture formed in said cover means being smaller in diameter than said first and second thrust bearings, and
   locking means for engaging said end portion of said output drive shaft connecting means to prevent said end from being moved through said aperture formed in said cover means,
   said locking means being threaded onto said end portion of said output drive shaft against one of said thrust bearings to preload said thrust bearing positioned in contact therewith.

2. The gear box of claim 1 wherein said locking means includes a threaded lock nut having a slotted portion cut therein with bolt means threaded thereinto such that tightening of said bolt means binds the threads of said lock nut to prevent the rotation thereof.

3. The gear box of claim 2 wherein said bolt means are threaded through said lock nut into a securing plate for securing to said lock nut to prevent rotation thereof.

4. A power drive for coupling an automobile engine to a pusher propeller for use in powering an air-boat wherein the power drive has an output drive shaft which is restrained to prevent axial movement of the propeller outward from a gear box housing comprising:
   an automobile engine having a drive shaft to be coupled to a gear box for driving a pusher-type propeller,
   a gear box housing having an input drive shaft connected to the drive shaft of said automobile engine and an output drive shaft rotatably supported therein, a drive gear mounted on each of said input and output drive shafts such that rotation of said input drive shaft will effect rotation of said output drive shaft, means for coupling said input drive shaft to said engine drive shaft for imparting a rotational movement thereto, coupling means operatively connected to said output drive shaft to be rotationally driven therewith, said coupling means having coupled thereto a pusher-type propeller for imparting a rotational movement thereto in response to the rotational movement imparted to said input drive shaft, said coupling means including output drive shaft connecting means for engaging said output drive shaft to effect rotational movement of said coupling means with said output drive shaft, said output drive shaft connecting means including thrust-bearing means to receive an axially directed force applied to said coupling means by said propeller when rotatably driven by said automobile engine, cover means having an aperture formed therein for receiving said output drive shaft connecting means therethrough, said thrust-bearing means being positioned at one side of said cover means with an end portion of said output drive shaft connecting means extending through said cover means to a side opposite to the side of said cover at which said thrust-bearing means are positioned, said thrust bearing means comprising a first thrust bearing positioned on an outboard side of said cover means and a second thrust bearing positioned on an inboard side of said cover means, said aperture formed in said cover means being of a diameter less than the diameter of said second thrust bearing for preventing said second thrust bearing from being passed therethrough, and locking means for engaging said end portion of said output drive shaft connecting means to prevent said end from being moved through said aperture formed in said cover means to prevent the axial movement of said propeller out from said cover means, said lock means being threaded onto said end portion of said output drive shaft against said second thrust bearing to preload said second thrust bearing, and said locking means including a threaded lock nut having a slot formed therein and bolt means threaded thereinto to bind said lock nut threads to prevent rotation thereof upon preloading said second thrust bearing and to prevent said output drive shaft from being moved through said aperture in the event of failure of said second thrust bearing.

* * * * *